United States Patent [19]

White

[11] Patent Number: 5,027,835
[45] Date of Patent: Jul. 2, 1991

[54] APPARATUS FOR PNEUMATIC TRANSPORTATION OF PARTICULATE MATERIAL SUCH AS TOBACCO

[75] Inventor: Victor A. M. White, Finmere, England

[73] Assignee: GBE International PlC, Andover, England

[21] Appl. No.: 469,453
[22] PCT Filed: Aug. 15, 1989
[86] PCT No.: PCT/GB89/00947
  § 371 Date: May 11, 1990
  § 102(e) Date: May 11, 1990
[87] PCT Pub. No.: WO90/01882
  PCT Pub. Date: Mar. 8, 1990

[30] Foreign Application Priority Data

Aug. 17, 1988 [GB] United Kingdom ............... 8819586

[51] Int. Cl.⁵ .............................................. A29C 5/39
[52] U.S. Cl. ............................... 131/84.3; 406/93; 406/94; 131/110
[58] Field of Search ............ 131/84.3, 109.2, 84.4; 406/290, 46, 86, 93, 94, 117, 155, 191, 194

[56] References Cited

U.S. PATENT DOCUMENTS

Re. 29,042 11/1976 David .............................. 131/84.3
1,641,181 9/1927 Mahon .
3,871,385 3/1975 David .............................. 131/110
4,175,570 11/1979 Heitmann ....................... 131/84.3

FOREIGN PATENT DOCUMENTS 1138689 10/1962 Fed. Rep. of Germany .
1152951 8/1963 Fed. Rep. of Germany .
2161105 7/1973 France .
2553072 4/1985 France .
1331763 8/1987 U.S.S.R. ............................. 406/94
466191 5/1937 United Kingdom .
2088694 6/1982 United Kingdom .

Primary Examiner—V. Millin
Assistant Examiner—Jennifer L. Doyle
Attorney, Agent, or Firm—Ralph A. Dowell

[57] ABSTRACT

An apparatus for transporting particulate material, such as cut tobacco, including a duct having an inlet for receiving material to be transported, an outlet for transported material, air inlet zones in the duct wall for the passage of air under pressure into the duct and air outlet zones in the duct wall wherein the inlet zones and outlet zones are positioned in the duct wall and are so dimensioned to cause an air velocity in the duct which has a first velocity component directed to urge the material transported away from the wall of the duct and a second velocity component directed to urge the material along the length of the duct.

18 Claims, 4 Drawing Sheets

APPARATUS FOR PNEUMATIC TRANSPORTATION OF PARTICULATE MATERIAL SUCH AS TOBACCO

BACKGROUND OF THE INVENTION

Pneumatic transportation is used extensively in process industries. In some industries such as tobacco and food processing changes in the physical particle size distribution and product moisture are detrimental to final product quality and manufacturing economics. Impaction and abrasion of the product onto itself and onto the transport duct walls reduces the particle size and generates dust. If these reduced size components are incorporated into the final product, product quality is reduced and consumer satisfaction placed at risk. Their removal from the product increases wastage and material cost, or if a recovery process exists, they then incur additional recovery and conversion costs.

Generally the higher the air/gas transport duct velocity, the greater is the risk of such size degradation.

Considering those transport ducts used in the tobacco industry to supply material to cigarette makers, the air/gas velocity is typically 17 to 21 meters per second. It is recognised that the lower velocity causes much less product damage than does the higher velocity.

It is recognised that different stages within the transport duct require different energy inputs to the product via the air velocity. For example more energy is required to transport material horizontally than vertically due to the tendency of the material to settle out in a horizontal duct. Also transport round a bend requires more energy per unit length of duct than transport in a straight line.

Ignoring leakage and compression effects the volume of air/gas flowing along a section of a transport duct is substantially constant. This volume is set sufficiently high to meet the maximum local energy level requirement and energy losses due to length of duct and number or rises and bends. It is becoming more common to alter the size of sections of duct to give a local increase or decrease in velocity. For example, horizontal and bend sections could be of a reduced diameter, while declined sections could be of larger diameter. However, this approach can cause additional problems at the transition between sections.

Using cut tobacco as an example, the entrainment velocity is typically around 2 meters/second, compared to the 17 to 21 m/s ambient air velocity commonly used. The velocity of material movement in the direction of air movement is the difference between the entrainment velocity and the air velocity.

Consequently if air containing tobacco is moving in a horizontal duct as 17 m/s then the tobacco will be moving horizontally at about 15 m/s. However, gravity still acts and tobacco in the duct will move downwards at about 2 m/s. When this tobacco touches the duct wall it will slow down and may come to rest temporarily. As the depth of slow moving tobacco builds up it restricts the duct causing an increase in air velocity over the restriction. When the air velocity is sufficiently high the tobacco causing the restriction will be re-entrained into the main airstream.

SUMMARY OF THE INVENTION

An object of the present invention is to provide an improved duct design which alleviates these problems.

Accordingly the present invention provides apparatus for the transport of particulate material, such as cut tobacco, comprising a duct having an inlet for receiving the material to be transported and an outlet for transported material, air inlet zones in the duct wall for receiving air under pressure and air extraction zones in the duct walls, said inlet zones and extraction zones being so positioned in the duct wall and so dimensioned to cause an air velocity in the duct which has a first velocity component directed to urge the material transported away from the wall of the duct and a second velocity component directed to urge the material along the duct.

Preferably over a generally horizontal section of the duct, said first velocity component corresponds to the entrainment velocity for the material to be transported.

Preferably an additional air flow along the duct is superimposed upon said air velocity to assist transportation.

BRIEF DESCRIPTION OF THE DRAWINGS

In order to promote a fuller understanding of the above and other aspects of the invention some embodiments will now be described, by way of example only, with reference to the accompanying drawings in which.

DESCRIPTION OF THE PREFERRED EMBODIMENT

Figure 1:
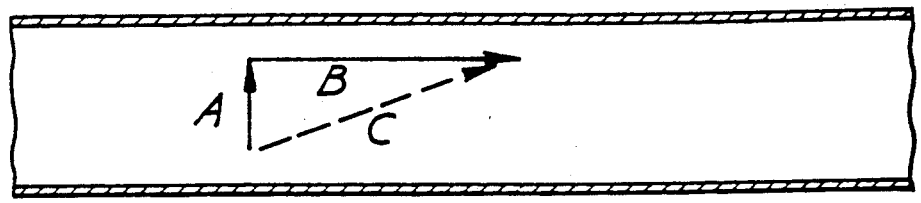
FIG. 1 is a velocity vector triangle showing velocity components in a duct.

FIG. 1 shows a typical horizontal duct section for air transport of material. A vertical first velocity component A of say some 2 m/s might be desired to support the material way from the bottom wall of the duct; and a horizontal second component B of say 10 m/s might be the optimum for transporting the material along the duct. The theoretical resultant C of these two components $(C = A^2 + B^2)$ is 10.19 m/s at an upward incline of about 11 degrees.

Figure 2:
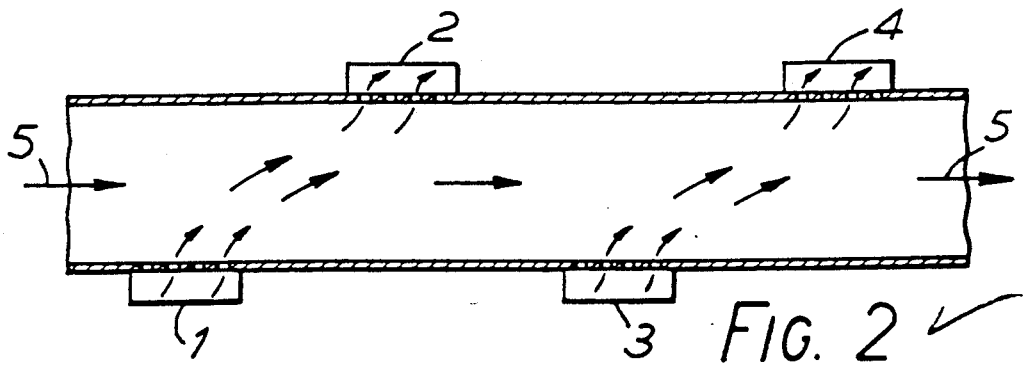
FIG. 2 is a duct having air injection and extraction zones.

FIG. 2 shows such an arrangement for a horizontal section of transport duct to achieve such velocity components and resultant. Air is introduced at zones 1 and 3 and removed at zones 2 and 4. In the arrangement shown it is assumed that the introduced air at zones 1 and 3 has no deliberate directionality. Consequently zones 1-2 and 3-4 must be sufficiently close that they present induced preferred airpaths and substantial airflow does not occur between zones 3 and 2. In such a situation the zones can be simple perforated areas. With such an arrangement it can be seen that the air velocity in the duct has a vertical component which urges the material away from the bottom wall of the duct; and has a horizontal component to transport the material along the duct.

However, it may be more convenient to deliberately assist airflow between the desired pairs of inlets and outlets by introducing an additional axial airflow 5, as in conventional systems but at a lower velocity.

Figure 3:
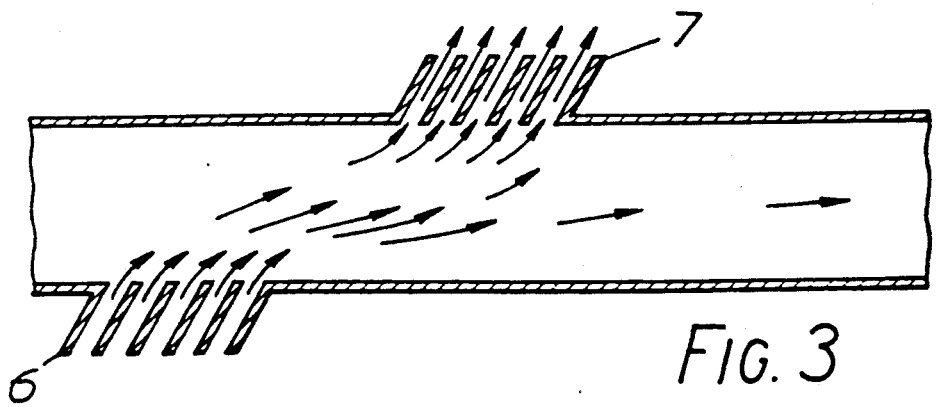
FIGS. 3 and 4 show modified forms of ducts having inclined inlets and extraction outlets.

Alternatively, the desired component velocities of airflow can be introduced within the duct as shown in FIG. 3 where the air inlet and outlet holes 6, 7 are inclined. The inlets and outlets may be formed in separately manufactured units or may be for example laser drilled at an angle in the duct wall. In the latter case the inlet zone could be continuous along the duct, as could the outlet zone.

Figure 4:
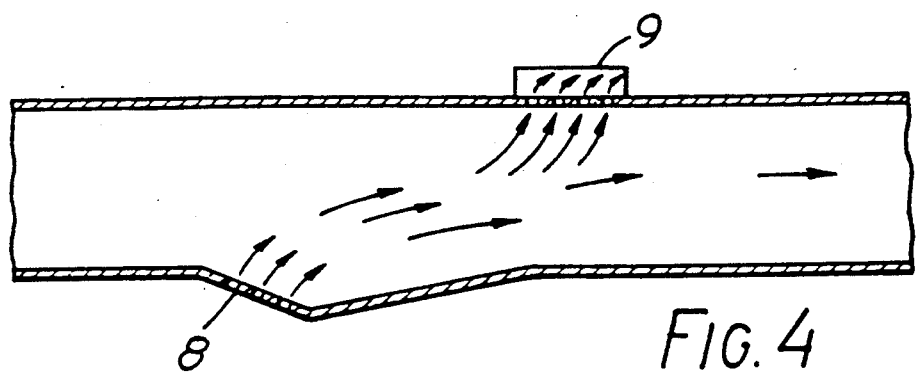

FIG. 4 shows another method of achieving the desired velocities of airflow comprising forming the air inlet zone 8 at an angle to the main duct, with at least some of the air leaving via the outlet zone 9.

At the discharge point of an air transport duct in conventional systems, the material and transport air gas are separated by an airlock or cyclone. Airlock systems cause rapid deceleration and cause the transported material to impact the components of the airlock. Cyclones involve abrasion of the product on the cyclone walls. It is desirable to separate the material from the airstream without the use of an airlock or cyclone.

Obviously the amount of air which needs to be removed is a prime factor in influencing how the air and material can be separated.

By the methods discussed in considering horizontal transport the gas/air velocity can be reduced and tailored to suit the transport stage. The same concepts can be applied to the separation and discharge stage.

Figure 5:
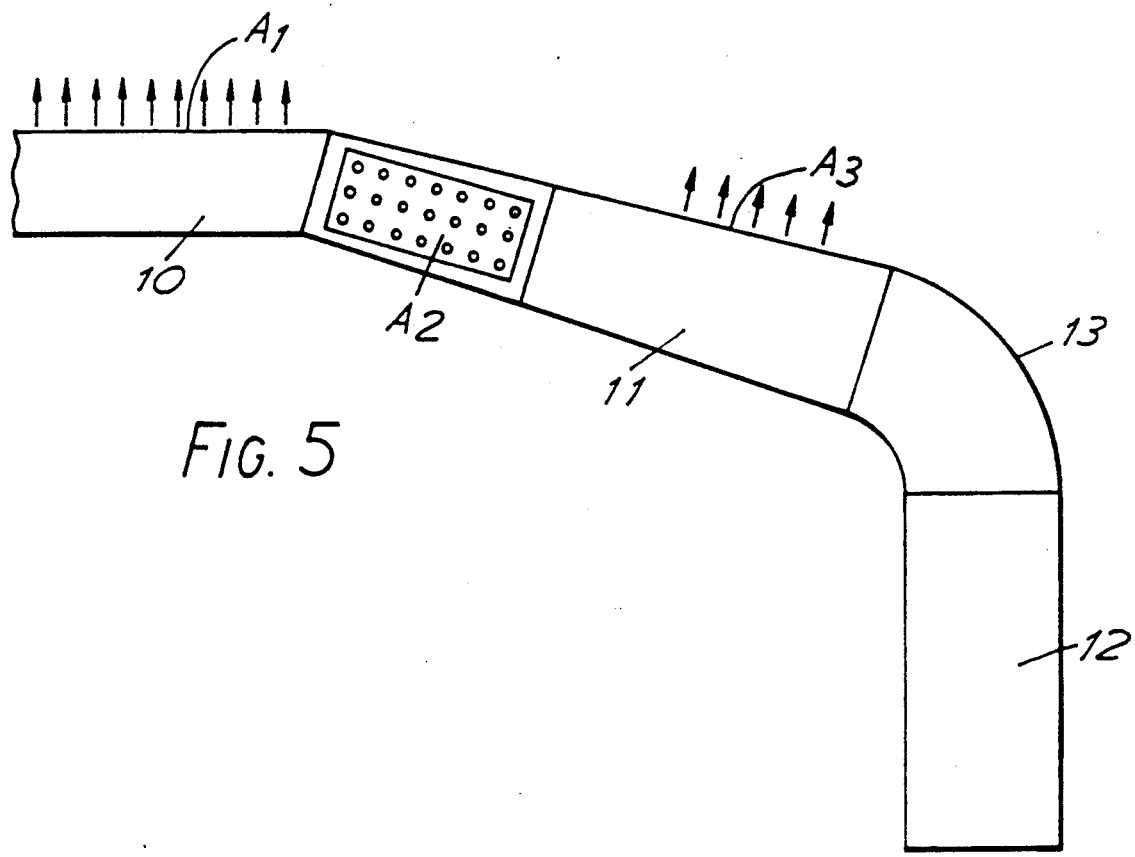
FIG. 5 is a duct having a delivery end region modified by a funnel leading to a material receiving hopper or metering tube.
Figure 6:
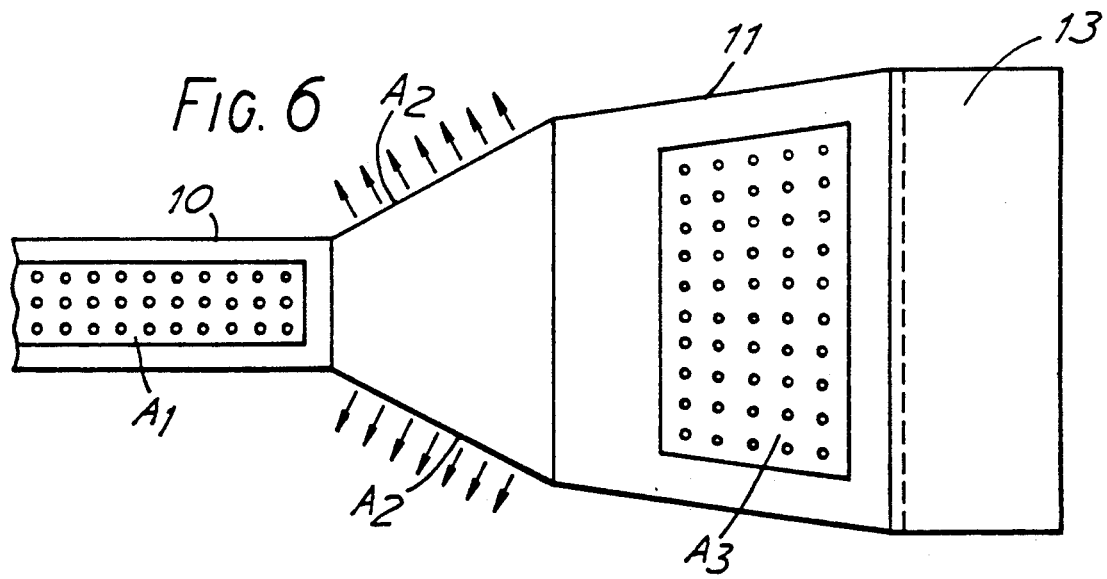
FIG. 6 is a plan view of the arrangement shown in FIG. 5.

FIGS. 5 and 6 illustrate part of a transport duct 10 which connects with a deceleration zone 11 which widens in the manner of a funnel. As material approaches the discharge end there is a reduced need for the airstream horizontal velocity component, consequently the quantity of air removed and the size of the air outlet zone A1 in the duct can be increased. As the air from the duct enters the deceleration section 11 it will spread and slow down, with the consequence that the forward velocity of the material will decrease. If air is extracted from side zones A2, it encourages the sideways spread of the main airstream and material stream. As the airstream spreads and its carrying capacity reduces, material will fall towards the lower surface of the deceleration section 11 which can be inclined downwards to accounts for this. It may be necessary to vibrate the deceleration zone to ensure sufficient material movement to the discharge point. The major portion of the air flowing through the duct 10 leaves via outlet zone A3. The air velocity through zone A3 must be sufficiently low not to entrain the transported material and to allow it to drop out of the deceleration zone.

The deceleration zone 11 may be arranged to discharge material into a receiving hopper or into metering tube assembly 12 as in FIGS. 5 and 6 via a transition bend 13. If a metering tube is used then its walls may contain air outlet zones.

Particle size rectification means (not shown) can be incorporated into the transport duct or deceleration section or separately after the metering tube.

Friction forces will cause material in transport to approach and probably contact the outer walls of a bend in the duct. This can be prevented by introducing air inlet zones H in the outer wall of the bend, as shown in FIG. 7, to achieve a velocity component across the duct at the bend urging the transported material away from the outer wall of the bend.

Vertical sections of duct are most likely to be required where the material to be transported in the duct is first picked up. Here the only required material motion is in line with the air motion so that in effect the first and second components of velocity of the airflow may be superimposed. This may be achieved as shown in the vertical section of the duct in FIG. 7, by placing inlet zones D opposite each other, with suitable outlet zones G above and opposite each other. But once the material has been lifted and transferred via a bend to the horizontal then more air velocity is required. Throughout the main transport system some additional air velocity component along the duct may be provided as discussed earlier with reference to FIG. 2.

Figure 7:
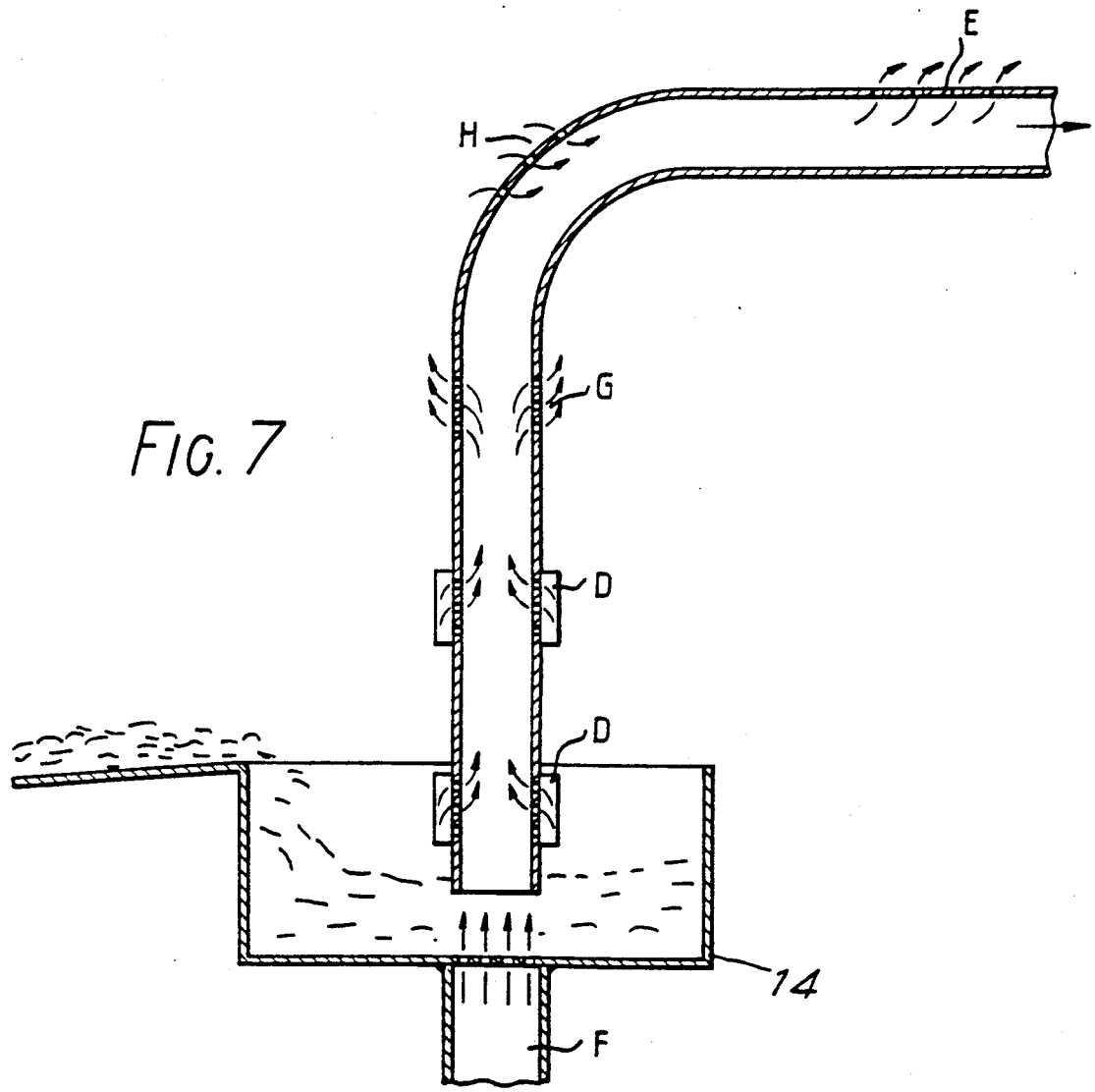
FIG. 7 is a schematic section of a pick-up end of a duct disposed within a reservoir.

In order to increase air velocity at a pick-up point, air can be blown from a pick-up tray 14 from which material is taken by the system, as shown at F in FIG. 7. Part of this extra air can be removed at outlet zones G and more at outlet zone E on a horizontal part of the duct. This also helps to produce a more uniform and directional air flow into the entrance of the duct.

Figure 8:
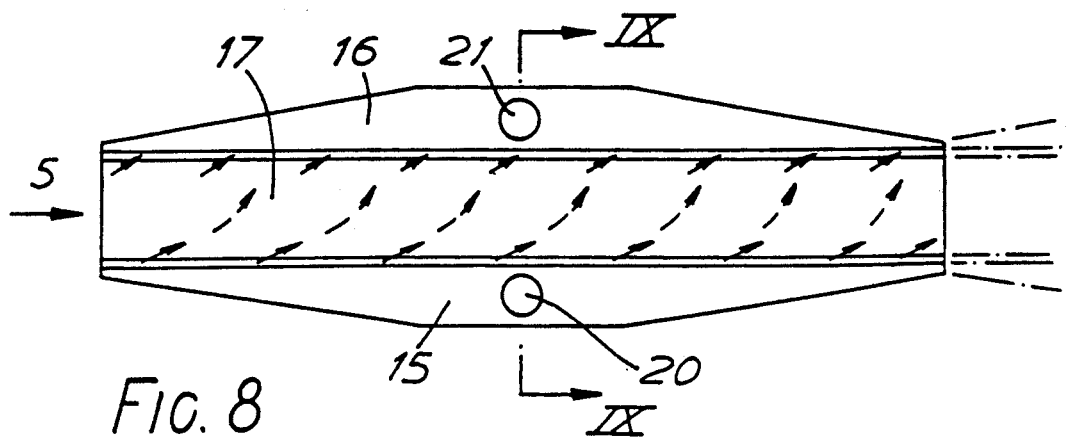
FIG. 8 shows a schematic side view of a horizontal duct module.
Figure 9:
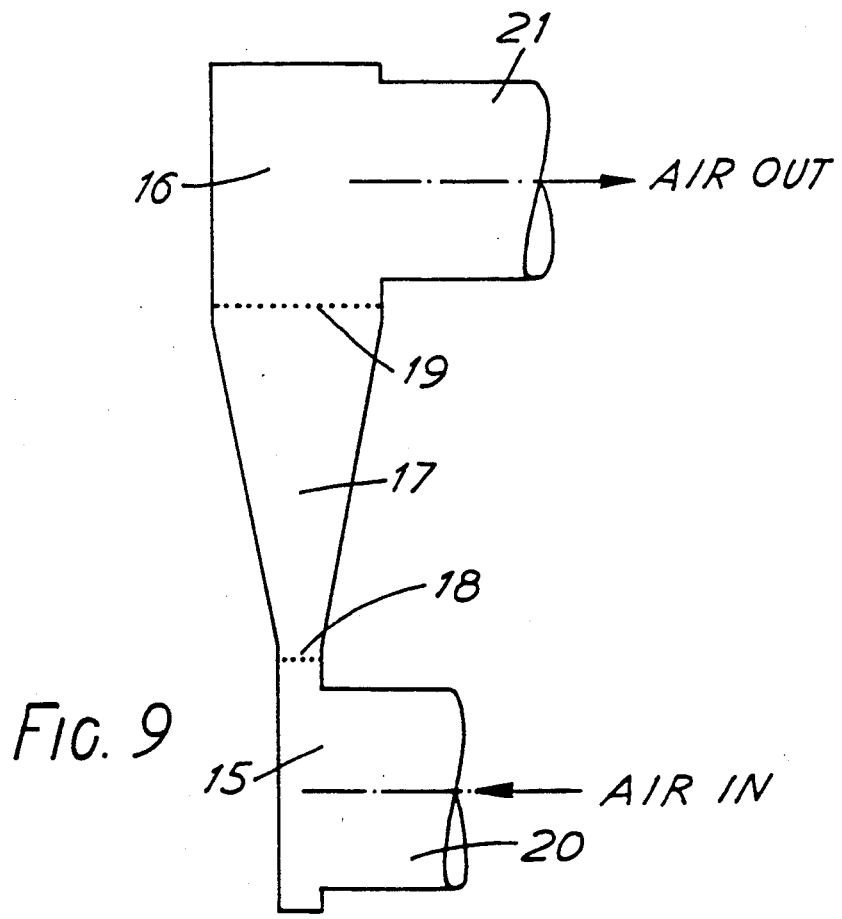
FIG. 9 shows, on an enlarged scale, a cross section on the line IX—IX of FIG. 8.

FIGS. 8 and 9 show a schematic side view of a horizontal duct module embodying the invention. In this module an inlet plenum chamber 15 and an outlet plenum chamber 16 are disposed below and above a section of duct 17. The inlet zones to the duct 17 are formed by angled perforations in the top wall of the inlet plenum chamber 15, as indicated at 18. The oulet zones from the duct 17 are similarly formed by perforations in the lower wall of the outlet plenum chamber 16, as indicated at 19. The inlet and outlet plenum chambers have respective air conduits 20 and 21.

As can be seen from FIG. 9, the air flow in the duct 17, which is of trapezoidal cross section is directed by the inlet and outlet zone perforations to have the vertical and horizontal components to support and transport the material as discussed above; with optionally the assistance of an additional airflow along the line of the duct.

In a preferred arrangement as shown the width, and thus the effective area per unit length of the duct, of the inlet perforations is less than the width of the outlet perforations. Preferably the width of the outlet perforations is approximately four times the width of the inlet perforations.

I claim:

1. An apparatus for the transport of particulate material comprising:
   (a) an elongated duct having peripheral walls including first and second opposing side wall portions, a material inlet for receiving the material to be transported, and a material outlet for transported material;
   (b) air inlets through said first side wall portions of said duct having an air guide surface set obliquely of said duct for directing a first flow of air under pressure into said duct with velocity components both longitudinally and transversely of said duct;
   (c) air outlets through said second side wall portions of said duct; and
   (d) said air inlets and air outlets being arranged along the entire length of said duct in order to maintain a substantial constant pressure differential along said duct from said material inlet to said material outlet wherein the longitudinal velocity of air urges the material along said duct and the transverse velocity component urges the material transported away from said first side wall portions of said duct.

2. An apparatus according to claim 1 in which said material inlet serves to admit a second flow of air longitudinally of said duct superimposed upon said first flow of air to assist transportation of the material along said duct.

3. An apparatus according to claim 2 in which said air inlets and air outlets include perforations in said first and second side wall portions of said duct.

4. An apparatus according to claim 1, 2 or 3, wherein said duct includes a curved section having an outer wall, additional air inlets being disposed through said outer wall.

5. An apparatus according to claim 1, 2, or 3, in which said duct includes a deceleration zone adjacent said material outlet for transported material, said deceleration zone widening in cross-sectional area in the direction of material flow.

6. An apparatus according to claim 5 in which said deceleration zone includes air outlets to encourage the spread of material transported therethrough.

7. An apparatus according to claim 5 in which said deceleration zone includes a secondary air outlet to maintain the air flow in said deceleration zone below a velocity sufficient to entrain the material to be transported.

8. The apparatus of claim 5 in which a bleed air outlet zone is provided in said duct immediately before said deceleration zone to reduce the air flow into said deceleration zone.

9. An apparatus according to claim 1, 2 or 3, in which said air inlets and air outlets are arranged in groups along said duct, the group of air inlets being offset in relation to the groups of air outlets so as to alternate between said air inlet groups and said air outlet groups along the length of said duct.

10. An apparatus according to claim 1, 2, or 3, in which said air inlets and air outlets are in the form of passages mounted on said first and second wall portions of said duct.

11. An apparatus according to claim 3 in which said first side wall portions of said duct include sections which are inclined in the direction of material transport through said duct and said air inlet perforations being through said sections.

12. An apparatus according to claim 1 wherein said duct includes a generally horizontal section and wherein an inlet and an outlet plenum chamber are in commumication with said air inlets and air outlets, respectively.

13. An apparatus according to claim 12 in which said horizontal section is constructed as a module to be assembled in a series of said modules.

14. An apparatus according to claim 12 or 13 in which said horizontal section of said duct is of trapezoidal cross section.

15. An apparatus according to claim 12 wherein said duct includes a generally vertical section, and wherein additional air inlets extend substantially around the peripheral walls of said duct along said vertical section.

16. An apparatus according to claim 15 in which additional air outlets are disposed above said additional air inlets in said vertical section.

17. An apparatus according to claim 15 in which an annular manifold is provided around said additional air inlets for the supply of air thereto.

18. An apparatus according to claim 17 including a tray for containing material to be transported, said vertical section of said duct extending from said tray, and said tray including means to inject air through the material immediately below said vertical section of said duct.

* * * * *